(12) United States Patent
Muller et al.

(10) Patent No.: US 9,845,261 B2
(45) Date of Patent: *Dec. 19, 2017

(54) METHOD OF MAKING HEAT TREATED COATED ARTICLE USING CARBON BASED COATING AND PROTECTIVE FILM

(71) Applicant: Guardian Industries Corp., Auburn Hills, MI (US)

(72) Inventors: Jens-Peter Muller, Differdange (LU); Vijayen S. Veerasamy, Ann Arbor, MI (US)

(73) Assignees: Centre Luxembourgeois de Recherches Pour le Verre et la Ceramique S.A. (C.R.V.C.), Grand Duche (LU); Guardian Glass, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,435

(22) Filed: May 18, 2015

(65) Prior Publication Data

US 2015/0246844 A1    Sep. 3, 2015

Related U.S. Application Data

(63) Continuation of application No. 13/491,743, filed on Jun. 8, 2012, now Pat. No. 9,038,419.

(51) Int. Cl.
*C03C 17/22*    (2006.01)
*C03C 17/36*    (2006.01)
(Continued)

(52) U.S. Cl.
CPC .............. *C03C 17/22* (2013.01); *C03B 25/02* (2013.01); *C03B 27/00* (2013.01);
(Continued)

(58) Field of Classification Search
None
See application file for complete search history.

(56) References Cited

U.S. PATENT DOCUMENTS 7,820,019 B2    10/2010    Butz et al.
7,964,238 B2    6/2011    Murphy et al.
(Continued)

OTHER PUBLICATIONS

U.S. Appl. No. 13/491,743, filed Jun. 8, 2012; Muller et al.
(Continued)

*Primary Examiner* — Cynthia Szewczyk
(74) *Attorney, Agent, or Firm* — Nixon & Vanderhye P.C.

(57) ABSTRACT

A method of making a heat treated (HT) substantially transparent coated article to be used in shower door applications, window applications, tabletop applications, or any other suitable applications. For example, certain embodiments relate to a method of making a coated article including a step of heat treating a glass substrate coated with at least layer of or including carbon (e.g., diamond-like carbon (DLC)) and an overlying protective film thereon. The protective film may be of or include both (a) an oxygen blocking or barrier layer, and (b) a release layer, with the release layer being located between at least the carbon based layer and the oxygen blocking layer. The release layer is of or includes zinc oxynitride (e.g., $ZnO_xN_y$). Following and/or during heat treatment (e.g., thermal tempering, or the like) the protective film may be entirely or partially removed. Other embodiments of this invention relate to the pre-HT coated article, or the post-HT coated article.

17 Claims, 5 Drawing Sheets

(51) Int. Cl.
  *C03C 17/34* (2006.01)
  *C03B 25/02* (2006.01)
  *C03B 27/00* (2006.01)
(52) U.S. Cl.
  CPC ...... *C03C 17/3435* (2013.01); *C03C 17/3441* (2013.01); *C03C 2217/78* (2013.01); *C03C 2218/328* (2013.01); *Y10T 428/30* (2015.01)

(56) References Cited

U.S. PATENT DOCUMENTS

| | | | |
|---|---|---|---|
| 8,003,167 B2 | 8/2011 | Krasnov et al. | |
| 8,071,166 B2 | 12/2011 | Petrmichl et al. | |
| 8,132,426 B2 | 3/2012 | Petrmichl et al. | |
| 8,147,972 B2 | 4/2012 | Veerasamy | |
| 8,277,946 B2 | 10/2012 | Veerasamy | |
| 9,038,419 B2 | 5/2015 | Muller et al. | |
| 2003/0049464 A1 | 3/2003 | Glenn et al. | |
| 2008/0014448 A1 | 1/2008 | Lu et al. | |
| 2010/0295330 A1 | 11/2010 | Ferreira et al. | |
| 2012/0015196 A1 | 1/2012 | Wang et al. | |
| 2012/0171439 A1 | 7/2012 | Kharchenko et al. | |
| 2013/0273377 A1 | 10/2013 | Veerasamy | |

OTHER PUBLICATIONS

"High Mobility Amorphous Zinc Oxynitride Semiconductor Material for Thin Film Transistors"; Ye et al., Journal of Applied Physics 106, (2009).

"Properties of Zinc Oxynitride Films Deposited by Reactive Magnetron Sputtering at Room Temperature"; Pau et al., Proc. of SPIE, vol. 7603.

"Optical Properties of Zinc Oxynitride Thin Films"; Futsuhara et al., Thin Solid Films 317 (1998) pp. 322-325.

U.S. Appl. No. 13/448,733, filed Apr. 17, 2012; Veerasamy.

U.S. Appl. No. 13/174,336, filed Jun. 30, 2011; Wang et al.

METHOD OF MAKING HEAT TREATED COATED ARTICLE USING CARBON BASED COATING AND PROTECTIVE FILM

This application is a continuation of application Ser. No. 13/491,743 filed Jun. 8, 2012 (now U.S. Pat. No. 9,038,419), the entire disclosure of which is hereby incorporated herein by reference in this application.

Certain embodiments of this invention relate to a method of making a heat treated (Hf) coated article to be used in shower door applications, window applications, tabletop applications, or any other suitable applications. For example, certain embodiments of this invention relate to a method of making a coated article including a step of heat treating a glass substrate coated with at least layer of or including carbon (e.g., diamond-like carbon (DLC)) and an overlying protective film thereon. In certain example embodiments, the protective film may be of or include both (a) an oxygen blocking or barrier layer, and (b) a release layer, with the release layer being located between at least the carbon based layer and the oxygen blocking layer. It has been found that a release layer of or including zinc oxynitride (e.g., $ZnO_xN_z$) is particularly beneficial with respect to one or more of durability, visible light transmissivity, and/or stability during storage and/or heat treatment. In certain example embodiments, measured on an atomic basis, the nitrogen to oxygen ratio z/x in the $ZnO_xN_z$ based release layer is from 0.40 to 1.2, more preferably from 0.55 to 1.2, more preferably from about 0.55 to 1.0, even more preferably from about 0.60 to 0.85, and most preferably from about 0.63 to 0.80. Following and/or during heat treatment (e.g., thermal tempering, or the like) the protective film may be entirely or partially removed. Other embodiments of this invention relate to the pre-HT coated article, or the post-HT coated article.

BACKGROUND AND SUMMARY OF THE INVENTION

Coated articles such as transparent shower doors and IG window units are often heat treated (HT), such as being thermally tempered, for safety and/or strengthening purposes. For example, coated glass substrates for use in shower door and/or window units are often heat treated at a high temperature(s) (e.g., at least about 580 degrees C., more typically from about 600-650 degrees C.) for purposes of tempering.

Diamond-like carbon (DLC) is sometimes known for its scratch resistant properties. For example, different types of DLC are discussed in the following U.S. Pat. Nos. 6,303, 226; 6,303,225; 6,261,693; 6,338,901; 6,312,808; 6,280, 834; 6,284,377; 6,335,086; 5,858,477; 5,635,245; 5,888, 593; 5,135,808; 5,900,342; and 5,470,661, all of which are hereby incorporated herein by reference.

It would sometimes be desirable to provide a window unit or other glass article with a protective coating including DLC in order to protect it from scratches and the like. Unfortunately, DLC tends to oxidize and burn off at temperatures of from approximately 380 to 400 degrees C., as the heat treatment is typically conducted in an atmosphere including oxygen. Thus, it will be appreciated that DLC alone as a protective overcoat cannot withstand heat treatments (HT) at the extremely high temperatures described above which are often required in the manufacture of vehicle windows, IG window units, glass table tops, and/or the like.

Prior art FIG. 1 illustrates a conventional technique which is described in U.S. Pat. No. 8,071,166, the disclosure of which is hereby incorporated herein by reference. As shown in FIG. 1, prior to thermal tempering, a coated article includes a glass substrate 1, a DLC layer 11, a zinc oxide release layer 117a, and an aluminum nitride (e.g., AlN) oxygen barrier layer 17b. This coated article on the left side of FIG. 1 is then subjected to heat treatment (HT) such as thermal tempering, and the protective film 17 protects the DLC layer 11 during such heat treatment and prevents the DLC from completely burning off. Following the HT, the protective film 17 is removed using a liquid as described in the '166 patent.

Thus, DLC layer 11 is protected with a thermal barrier overcoat film 17 that protects the carbon based layer 11 from complete oxidation during tempering, with the protective film 17 thereafter being removed. Much of the protective overcoat 17 thickness consists of a cermet (ZnO—Zn) 117a, the rest being a dense dielectric of AlN 17b.

It has been found that the cermet (ZnO—Zn; ZnOx) 117a has a high electrochemical potential compared to stoichiometric ZnO and is therefore thermodynamically metastable. The cermet is susceptible to humidity ingress and acts like a battery during sequences of high and low humidity/temperature. Over-extended grains of ZnO—Zn cermet are believed to create regions of high electrochemical potential which are readily attacked by water molecules to start an oxidative corrosion process of Zn to ZnO. To address these deficiency caused by the (ZnO—Zn; ZnOx) 117a, it has been attempted to further protect the protective film 17 with a thin polymer based flexible film (e.g., TPF), not shown, that can be peeled off. Moreover, it has also been found that the cermet has been problematic with respect to adhesion instabilities, and regarding causing burns in overlap areas where adjacent protective TPF films such as Novacel TPF 9047 overlap each other.

When the cermet (ZnO—Zn; ZnOx) 117a is about 160 nm thick for example, it has been found to have a rough surface with macroparticles sized at about 100 nm. Thus, for example, a 60 nm AlN layer 17b on top of the cermet 117a may not be thick enough to cover the cermet completely given the presence of such macroparticles. It is believed that the problems discussed above, including a significantly chemically active surface of the protective coating, is/are caused at least in part by the cermet 117a not being fully oxidized ZnO. The prior art stack in FIG. 1 has deficiencies including (i) being inhomogeneous and based on a bi-phasal matrix of ZnO—Zn, and (ii) the presence of large macro-grains of ZnO/Zn in the matrix which can result in the top AlN not conforming to the release layer and allows water vapor molecules to reach the ZnO—Zn layer before and/or during HT. These two deficiencies, in combination, give rise to the instability of the overcoat 17 and its susceptibility to humidity even in the presence of further protective TPF.

In certain example embodiments of this invention, it has been found that one or more of the above problems can be solved and/or addressed by introducing significant amounts of nitrogen (N) into the zinc oxide inclusive release layer, so that the release layer is of or including zinc oxynitride (e.g., $ZnO_xN_z$). This allows the thermal barrier stack to be electrochemically substantially inactive prior to and/or during heat treatment such as thermal tempering. The phase of the release layer is substantially homogenized by introducing N in such a manner so as to produce a substantially uniform phase of zinc oxynitride. This helps stabilize the matrix, using control of the nitrogen to oxygen ratio in the release layer itself and/or during its deposition. The improved release layer is advantageous in that (i) the protective coating now has a higher degree of electrochemical homogeneity—lower chemical gradient within film, (ii) smoother release layers and protective films can be realized, and/or (iii) nitrogen atoms passivate the ZnO in the release layer and provide a more chemically stable interface with the barrier layer (e.g., AlN). Advantageously, the protective film can remain substantially stable throughout the sequence of environments that the layer stack is exposed to, including transportation and storage prior to and during HT such as thermal tempering.

In certain example embodiments of this invention, there is provided a method of making a heat treated coated article, the method comprising: heat treating a coated glass substrate, the coated glass substrate comprising, prior to the heat treating, a glass substrate, a layer comprising carbon (e.g., DLC) on the glass substrate, and a protective film on the glass substrate over at least the layer comprising carbon, wherein the protective film includes a release layer and an oxygen barrier layer, wherein the release layer comprises or consists essentially of zinc oxynitride $ZnO_xN_z$, and where a nitrogen to oxygen ratio z/x in the release layer is at least 0.40 or at least 0.55; during said heat treating of the coated glass substrate with the layer comprising carbon and the protective film thereon, the protective film prevents significant burnoff of the layer comprising carbon, and wherein the heat treating comprises heating the glass substrate to temperature(s) sufficient for thermal tempering, heat strengthening, and/or heat bending; and removing (e.g., using a removing liquid(s)) at least part of the protective film during and/or after said heat treating. In certain example embodiments of this invention, the release layer is a dielectric layer. In certain example embodiments, measured on an atomic basis, the nitrogen to oxygen ratio z/x in the $ZnO_xN_z$ based release layer is from 0.40 to 1.2, more preferably from 0.55 to 1.2, more preferably from about 0.55 to 1.0, even more preferably from about 0.60 to 0.85, and most preferably from about 0.63 to 0.80.

In certain example embodiments of this invention, there is provided a method of making a heat treated coated article, the method comprising: heat treating a coated glass substrate, the coated glass substrate comprising, prior to the heat treating, a glass substrate, a layer comprising carbon on the glass substrate, and a protective film on the glass substrate over at least the layer comprising carbon, wherein the protective film includes a release layer and an oxygen barrier layer, wherein the release layer comprises zinc oxynitride $ZnO_xN_z$ and where at least one of: (i) a nitrogen to oxygen ratio z/x in the release layer is at least 0.40, and/or (ii) a ratio of nitrogen gas to oxygen gas during sputtering in an atmosphere in which the release layer is sputter-deposited is at least 0.40; during said heat treating of the coated glass substrate with the layer comprising carbon and the protective film thereon, the protective film prevents significant burnoff of the layer comprising carbon, and wherein the heat treating comprises heating the glass substrate to temperature (s) sufficient for thermal tempering, heat strengthening, and/or heat bending; and removing at least part of the protective film during and/or after said heat treating

DETAILED DESCRIPTION OF EXAMPLE EMBODIMENTS OF THE INVENTION

Figure 1:
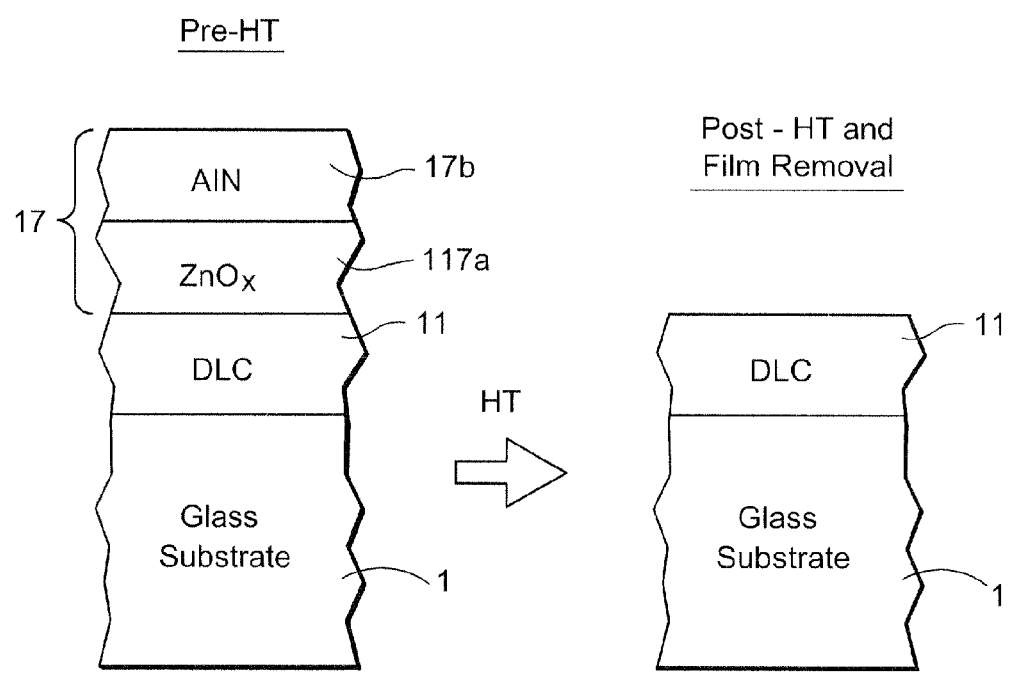
FIG. 1 is a schematic cross sectional view of a coated article, prior to and following heat treatment, according to a conventional technique.

Referring now more particularly to the accompanying drawings in which like reference numerals indicate like parts throughout the several views.

Referring to FIGS. 2-5, a significant amount of nitrogen (N) is provided in the zinc oxide inclusive release layer 17a, so that the release layer 17a is of or including zinc oxynitride (e.g., $ZnO_xN_z$). This allows the protective thermal barrier stack/film 17 to be electrochemically substantially inactive prior to and/or during heat treatment (HT) such as thermal tempering. The phase of the release layer 17a is substantially homogenized by introducing N in such a manner so as to produce a substantially uniform phase of zinc oxynitride, and the release layer 17a is substantially stoichiometric (e.g., atomically, the combined amount of oxygen and nitrogen is close to that of zinc) and not metallic or conductive in certain example embodiments. The addition of significant amounts of nitrogen into layer 17a helps stabilize the matrix, using control of the nitrogen to oxygen ratio in the release layer itself and/or during its deposition. The improved release layer 17a is advantageous in that (i) the protective coating 17 has a higher degree of electrochemical homogeneity—lower chemical gradient within film, (ii) smoother release layers 17a and protective films 17 can be realized, and/or (iii) nitrogen atoms passivate the ZnO in the release layer 17a and provide a more chemically stable interface with the barrier layer (e.g., AlN) 17b. Advantageously, the protective film 17 can remain substantially stable throughout the sequence of environments that the layer stack (e.g., at least 11 and 17) is exposed to, including transportation and storage prior to and during HT such as thermal tempering. In certain example embodiments, the protective film 17 includes a release layer 17a and an oxygen barrier layer 17b, wherein the release layer comprises or consists essentially of zinc oxynitride $ZnO_xN_z$, and where a nitrogen to oxygen ratio z/x in the release layer 17a is at least 0.40 or at least 0.55. During heat treating (e.g., thermal tempering) of the coated glass substrate 1 with the layer comprising carbon 11 and the protective film 17 thereon, the protective film 17 prevents significant burnoff of the layer comprising carbon. The heat treating (HT) typically includes heating the glass substrate 1 to temperature(s) sufficient for thermal tempering, heat strengthening, and/or heat bending. After and/or during HT, part of all of the protective film 17 is removed (e.g., using a removing liquid such as water and/or vinegar). In certain example embodiments, the release layer is a dielectric layer and, measured on an atomic basis, the nitrogen to oxygen ratio z/x in the $ZnO_xN_z$ based release layer 17a is from 0.40 to 1.2, more preferably from 0.55 to 1.2, more preferably from about 0.55 to 1.0, even more preferably from about 0.60 to 0.85, and most preferably from about 0.63 to 0.80. In certain example embodiments, measured on an atomic basis, a ratio of nitrogen gas to oxygen gas used during sputtering in an atmosphere in which the release layer 17a is sputter-deposited from at least one sputtering target is from 0.40 to 1.2, more preferably from 0.55 to 1.2, more preferably from about 0.55 to 1.0, even more preferably from about 0.60 to 0.85, and most preferably from about 0.63 to 0.80.

In certain instances, the HT may involve heating a supporting glass substrate 1, with the carbon (e.g., DLC) 11 thereon, to temperature(s) of from 550 to 800 degrees C., more preferably from 580 to 800 degrees C. (which is well above the burn-off temperature of DLC). The sacrificial protective film 17 allows the DLC 11 to withstand such HT without significantly burning off and/or without significantly oxidizing during the same. Sacrificial protective film 17 is formed on the glass substrate 1 over the DLC 11 to reduce the likelihood of the DLC burning off during HT. Thus, the majority (if not all) of the DLC 11 remains on the glass substrate 1, and does not burn off, during the HT. Following HT, the sacrificial protective film 11 (which may include two or more layers) may or may not be removed in different embodiments of this invention.

In certain example embodiments, the sacrificial protective film 17 may be of or include both (a) an oxygen blocking or barrier layer 17b, and (b) a release layer 17a. An example advantage of using distinct and different oxygen-blocking and release layers in film 17 is that each layer (17a and 17b) can be optimized for its intended function. Consequently, the optimized performance of the sacrificial film 17 may be improved and it can be made thinner if desired. In certain example embodiments, following HT and removal of the film 17, the DLC inclusive layer 11 protects the glass substrate 1 against abrasion and corrosion, and against adhesion of minerals in hard water (e.g., has good hard water cleanability).

Figure 2:
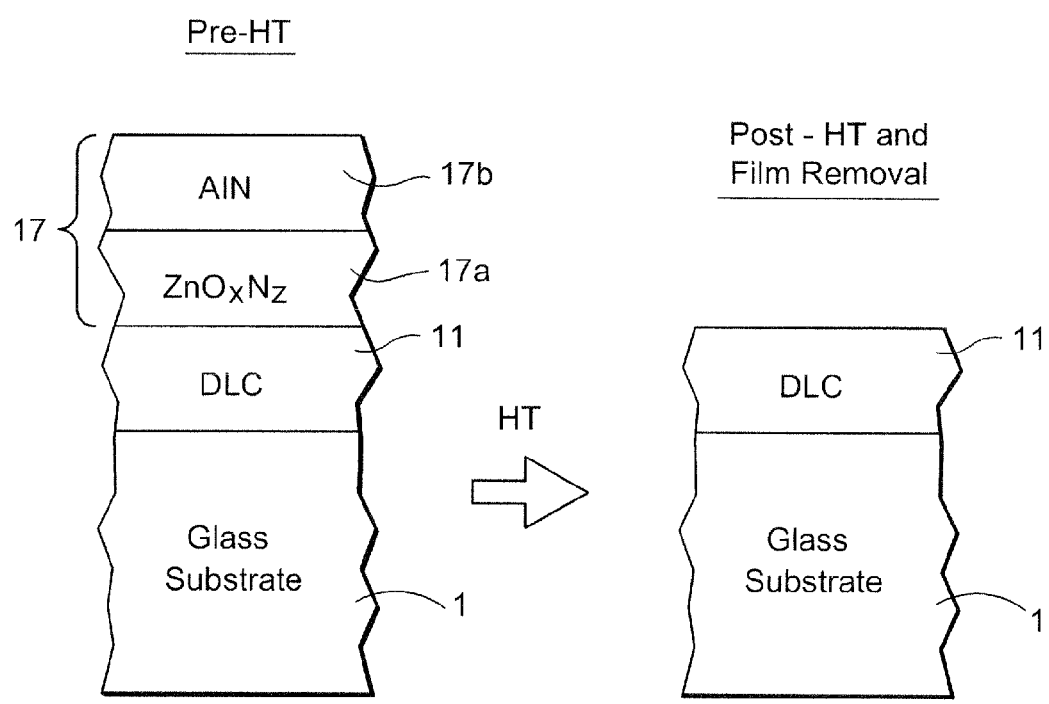
FIG. 2 is a schematic cross sectional view of a coated article, prior to and following heat treatment, according to an example embodiment of this invention.

FIG. 2 is a schematic cross sectional view of a coated article, before and after heat treatment, according to an example embodiment of this invention. Typically, the coated article on the left side of FIG. 2 exists during a stage of manufacture prior to heat treatment (HT), but may also exist post-HT in certain instances. The coated article shown in FIG. 2 includes glass substrate 1, DLC inclusive layer 11, and sacrificial protective film 17 which may include two or more layers. In certain example embodiments, the protective film 17 includes first and second layers 17a and 17b which are of different material.

Glass substrate 1 is typically of or includes soda-lime-silica glass, although other types of glass may be used in certain instances.

DLC inclusive layer 11 may be from about 5 to 1,000 angstroms (Å) thick in certain example embodiments of this invention, more preferably from 10-300 Å thick, and most preferably from 20 to 65 Å thick, possibly from about 25-50 Å thick, with an example thickness being about 30 angstroms. In certain example embodiments of this invention, DLC layer 11 may have an average hardness of at least about 10 GPa, more preferably at least about 20 GPa, and most preferably from about 20-90 GPa. Such hardness renders layer(s) 11 resistant to scratching, certain solvents, and/or the like. Layer 11 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC type or any other suitable type of DLC may include from 1 to 30% hydrogen, more preferably from 5-20% H, and most preferably from 10-20% H. This t-aC type of DLC includes more $sp^3$ carbon-carbon (C—C) bonds than $sp^2$ carbon-carbon (C—C) bonds. In certain example embodiments, at least about 30% or 50% of the carbon-carbon bonds in DLC layer 11 may be $sp^3$ carbon-carbon (C—C) bonds, more preferably at least about 60% of the carbon-carbon bonds in the layer 11 may be $sp^3$ carbon-carbon (C—C) bonds, and most preferably at least about 70% of the carbon-carbon bonds in the layer 11 may be $sp^3$ carbon-carbon (C—C) bonds. In certain example embodiments of this invention, the DLC may have an average density of at least about 2.4 $gm/cm^3$, more preferably at least about 2.7 $gm/cm^3$. Example linear ion beam sources that may be used to deposit DLC inclusive layer 11 on substrate 1 include any of those in any of U.S. Pat. Nos. 6,261,693, 6,002,208, 6,335,086, or 6,303,225 (all incorporated herein by reference). When using an ion beam source to deposit layer(s) 11, hydrocarbon feedstock gas(es) (e.g., $C_2H_2$), HMDSO, or any other suitable gas, may be used in the ion beam source in order to cause the source to emit an ion beam toward substrate 1 for forming layer(s) 11. It is noted that the hardness and/or density of layer(s) 11 may be adjusted by varying the ion energy of the depositing apparatus.

DLC layer 11 allows the coated article to be more scratch resistant than if the DLC 11 were not provided. It is noted that while layer 11 is on glass substrate 1 in certain embodiments of this invention, additional layer(s) may or may not be under layer 11 between the substrate 1 and layer 11 in certain example embodiments of this invention. Thus, the phrase "on" as used herein is not limited to being in direct contact with the substrate as other layer(s) may still be provided therebetween. Thus, "on" and "support" as used herein mean both directly on and indirectly on with other layer(s) therebetween.

For example and without limitation, the layer 11 of or including DLC may be any of the DLC inclusive layers of any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; or 5,470,661 (all of these patents hereby being incorporated herein by reference), or alternatively may be any other suitable type of DLC inclusive layer. DLC inclusive layer 11 may be hydrophobic (high contact angle), hydrophilic (low contact angle), or neither, in different embodiments of this invention. The DLC 11 may or may not include from about 5-30% Si, more preferably from about 5-25% Si, and possibly from about 10-20% Si in certain example embodiments of this invention. Hydrogen may also be provided in the DLC in certain instances.

Sacrificial protective film 17 is provided in order to protect DLC layer 11 during HT. If film 17 were not provided, the DLC 11 would significantly oxidize during HT and burn off, thereby rendering the final product defenseless against scratching. However, the presence of sacrificial protective film 17 prevents or reduces the amount of oxygen which can reach the DLC 11 during HT from the surrounding atmosphere, thereby preventing the DLC from significantly oxidizing during HT. As a result, after HT, the DLC inclusive layer 11 remains on the glass substrate 1 in order to provide scratch resistance and/or the like. In certain example embodiments, the protective film 17 includes both an oxygen blocking or barrier layer 17b, and an underlying release layer 17a. The release layer 17a may be in directly contact with the DLC layer 11 in certain example embodiments, e.g., as shown in FIG. 2.

It has been found that the use zinc oxynitride for release layer 17a and aluminum nitride (e.g., AlN) 17b for oxygen blocking/barrier layer 17b in sacrificial protective film 17 is/are especially beneficial with respect to reducing and/or preventing oxygen diffusion into the DLC during HT. In the FIG. 2 example embodiment of this invention, the protective film 17 includes a first zinc oxynitride inclusive layer 17a which is the release layer, and aluminum nitride inclusive layer 17b which is an oxygen barrier layer. An oxygen "blocking" or "barrier" layer means that the layer blocks significant amounts of oxygen from reaching the DLC during HT.

The different compositions of layers 17a and 17b is used to cause different stresses in layers 17a and 17b, which stresses are manipulated so as to allow the film 17 to be more easily removed during and/or following HT. In particular, layer 17a of or including zinc oxynitride (which may or may not be doped with from about 1-12% Al, more preferably from about 1-6% Al) may be considered a release layer for allowing the film 17 to be easily removed from the DLC or substrate during and/or after HT, whereas the more dense layer 17b of or including a material such as aluminum nitride may be considered an oxygen blocking or barrier layer that reduces or prevents the DLC 11 from burning off and/or oxidizing during HT. Note also that any gettering layer may be considered an oxygen barrier layer in certain example instances. The more dense layer 17b also may be considered a blocking/protection layer for protecting the softer release layer 17a during heat treatment, storage, and otherwise. Zinc oxide is a highly advantageous material for use in release layer 17a because it can be easily removed (e.g., using water and/or vinegar) during and/or following HT in a non-toxic manner, and the introduction of significant amounts of nitrogen into the layer 17a is advantageous as explained above. In certain example embodiments, the release layer is a dielectric layer. In certain example embodiments, the nitrogen to oxygen ratio z/x in the $ZnO_xN_z$ layer 17a (optionally doped with material such as aluminum) is from 0.40 to 1.2, more preferably from 0.55 to 1.2, more preferably from about 0.55 to 1.0, even more preferably from about 0.60 to 0.85, and most preferably from about 0.63 to 0.80.

One or both of layers 17a, 17b may be sputter-deposited on substrate 1 over the carbon based layer 11 in certain example embodiments of this invention. Note that one or both of layers 17a and 17b may be doped with other materials such as Zr, Ni, Fe, Cr, Ti, Mg, mixtures thereof, or the like, in certain example embodiments of this invention.

In certain example embodiments of this invention, release layer 17a may be deposited (e.g., via sputtering) so as to be from about 50-20,000 Å thick, more preferably from about 50-3,000 Å thick, even more preferably from about 100-2,000 Å thick, with an example thickness being from about 1,000-2,000 Å (e.g., about 1600 angstroms thick). In certain embodiments, aluminum nitride inclusive barrier layer 17b may be deposited (e.g., via sputtering) so as to be from about 200-10,000 Å thick, more preferably from about 300-5,000 Å thick, more preferably from about 400-800 Å thick, with an example thickness being about 600 Å. Release layer 17a may be thicker than barrier layer 17b in certain example embodiments of this invention; e.g., layer 17a may be at least 25% thicker than layer 17b in certain example instances prior to HT. A preferred thickness of overall sacrificial film 17 in certain example embodiments is less than about 10,000 Å, more preferably less than about 3,000 Å, and most preferably less than about 2,500 Å.

Figure 3:
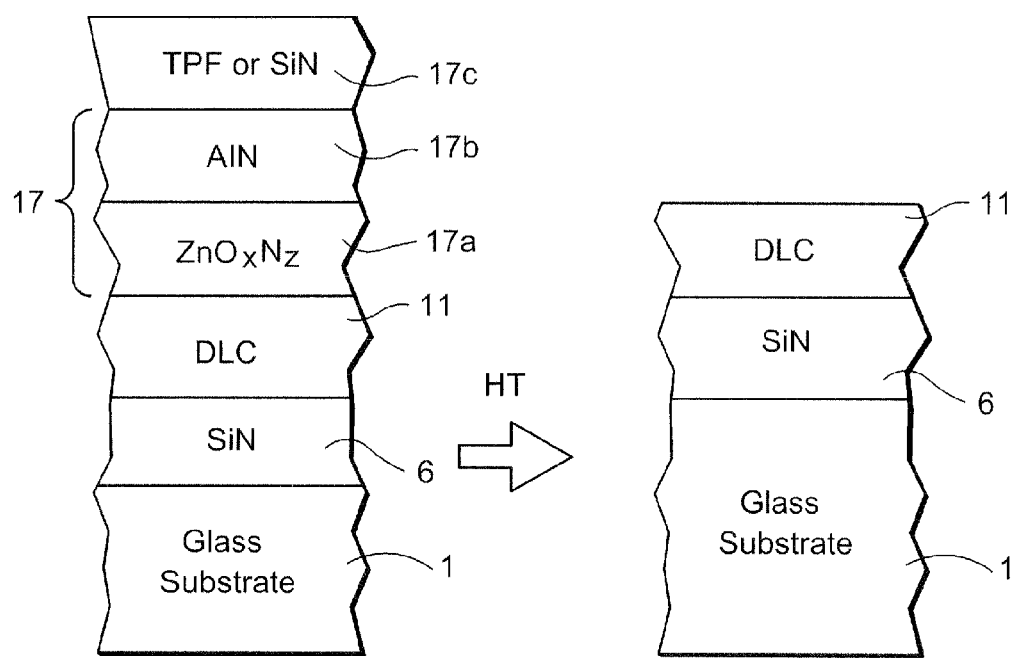
FIG. 3 is a schematic cross sectional view of a coated article, prior to and following heat treatment, according to another example embodiment of this invention.

FIG. 3 is applicable to any of the embodiments discussed herein. For example, FIG. 3 can be the same as the FIG. 2 embodiment, except for additional dielectric layers 6 and 17c. FIG. 3 shows an example embodiment where the release layer 17a is of or includes zinc oxynitride as discussed above, the oxygen blocking or barrier layer 17b is of or includes aluminum nitride (e.g., AlN), and a top coat protective layer 17c of or including silicon nitride and/or silicon oxynitride is provided. Optionally, a dielectric barrier layer 6 (e.g., of or including silicon nitride, silicon oxide, and/or silicon oxynitride) may be provided between the DLC 11 and the glass substrate 1 for reducing sodium migration from the glass during or due to HT. After heat treatment or HT (e.g., tempering), the product is exposed to a mildly reactive liquid (e.g., water, vinegar, dilute ammonia and/or bleach) as in other embodiments herein, and the liquid penetrates through to the release layer 17a via pinholes or grain boundaries in the overlying layer(s) and causes the release layer to disband from the DLC 11. Thus, the release layer 17a, the oxygen barrier layer 17b, and the protective layer 17c are removed following the HT. Vinegar is a particularly good release liquid for use with the materials shown in the FIG. 8 embodiment, although other liquid(s) such as water may also or instead be used for removal of sacrificial film 17. As with other embodiments herein, brushing (e.g., via rotating brushes such as nylon brushes or the like) may be used to remove film 17 when wetted with water, vinegar, or the like in certain example instances. Example thickness for layers 6 and 17c are as follows in this example embodiment: barrier layer 6 of or including silicon nitride from about 100-300 Å thick (e.g., about 200 Å thick); and protective silicon nitride inclusive layer 17c from about 0-500 Å thick (e.g., about 200-300 Å thick). Optionally, a thin polymer based flexible film (e.g., TPF) such as Novacel 9047 may be used for protective layer 17c (instead of silicon nitride) in certain example embodiments. In such embodiments, the TPF can be provided as layer 17c during storage and/or shipment, and can be peeled off before, during, or after HT. It has surprisingly been found that certain significant amounts of nitrogen in the zinc oxynitride based release layer 17a can reduce or prevent significant burns during HT in overlap areas where adjacent protective TPF films such as Novacel TPF 9047 overlap. Such a protective TPF layer(s) 17c over the barrier layer 17b may be used in any embodiment herein.

Figure 4:
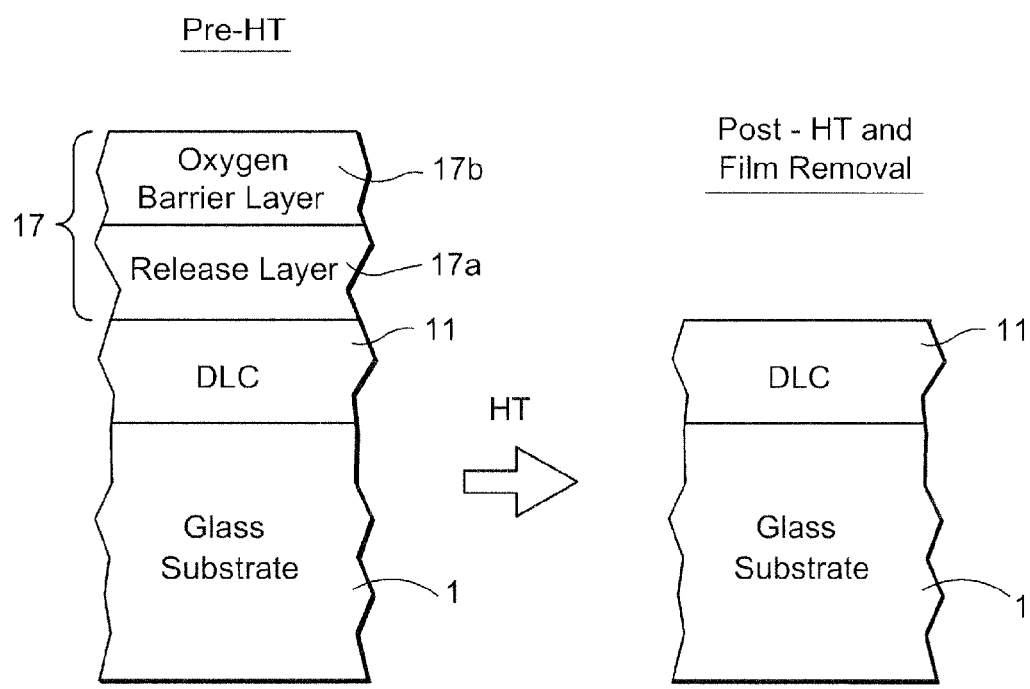
FIG. 4 is a schematic cross sectional view of a coated article, prior to and following heat treatment, according to an example embodiment of this invention.

FIG. 4 is a cross sectional view of an example embodiment of this invention that is similar to FIGS. 2-3, except that the materials are not so limited. For example, oxygen blocking/barrier layer 17b need not be of aluminum nitride. A barrier layer 6 (discussed above) may or may not be provided between the glass and the DLC in the FIG. 4 embodiment (although it is not shown in the figure). The oxygen blocking/barrier layer 17b may be of or include a material selected from the group consisting of: zinc oxide, silicon carbide, aluminum nitride, boron oxide, aluminum oxide, aluminum oxynitride, silicon nitride, silicon oxide, silicon oxynitride, and mixtures thereof. Preferred materials for the oxygen blocking or barrier layer 17b are aluminum nitride, aluminum oxynitride, and silicon carbide in certain example embodiments. In certain example embodiments, the layer 17b is designed to be at least as hard and/or durable as glass. Release layer 17a may be of material (e.g., zinc oxynitride or zinc aluminum oxynitride) that dissolves or readily reacts with water, vinegar, and/or bleach. Release layer 17a preferably has a melting point (or dissociation temperature) above 580 or 600 degrees C. in certain example embodiments. Note that the term "oxide" as used herein is broad enough to encompass suboxides. Release layer 17a is typically more dissolvable than is layer 17b in water, vinegar, bleach and/or the like. Moreover, in certain example embodiments, oxygen barrier layer 17b is more of a barrier to oxygen and/or is harder than is release layer 17a. Exemplary coatings may produce high quality post-HT and post-release DLC, with good scratch resistance and good hard water cleanability. The release layer 17a and/or the oxygen barrier layer 17b may be deposited via sputtering, or any other suitable technique, in different example embodiments of this invention.

An example process of manufacturing a coated article will now be described, with reference to FIGS. 2-4. Initially, glass substrate 1 is provided, and at least one barrier layer 6 (e.g., silicon oxide, silicon nitride, silicon oxynitride, or the like) may optionally be sputtered on a surface thereof. Optionally, a multi-layer solar control coating (not shown) may be deposited (e.g., via sputtering) on the surface of the glass substrate 1 opposite the barrier layer 6. At least one layer 11 of or including DLC is deposited (e.g., via ion beam deposition) on the glass substrate 1, over at least the optional barrier layer 6 if present. Then, protective film 17, e.g., including layers 17a and 17b, is deposited on the substrate 1 over the DLC inclusive layer 11. Protective film 17 may be deposited via sputtering, CVD, ion beam deposition, or any other suitable technique. Optionally, a thin protective layer comprising DLC, silicon nitride, or silicon aluminum nitride (not shown), may be provided over sacrificial film 17 prior to HT, for durability and/or oxygen barrier purposes. As shown in FIGS. 2-4, the glass substrate 1 with films 6 (optional), 11 and 17 thereon is then heat treated (HT) for purposes of thermal tempering, heat bending, heat strengthening, and/or the like. At least part of this HT may be conducted, for example, in an atmosphere including oxygen as known in the art at temperature(s) of from 550 to 800 degrees C., more preferably from 580 to 800 degrees C. (i.e., temperature(s) above the burn-off temperature of DLC). The HT may last for at least one minute, more preferably from 1-10 minutes, in certain example non-limiting embodiments of this invention. During HT, the presence of protective film 17 protects DLC inclusive layer 11 from the HT and prevents layer 11 from significantly oxidizing and/or burning off due to significant oxidation during the HT. While in some instances some of layer 11 may burn off during HT, the majority if not all of DLC inclusive layer 11 remains on the substrate 1 even after the HT due to the presence of protective film 17. A significant advantage associated with using zinc oxynitride in the release layer 17a is its ease of removal after HT. Sole layers of silicon nitride for example require complex etching in order to remove the same after HT. On the other hand, it has been found that when release layer 17a is of or including zinc oxynitride, the application of vinegar and/or water allows portions of film 17 remaining after HT to be easily removed (e.g., along with rubbing/brushing) in a non-toxic manner. In certain example instances, rubbing with such liquids may be especially beneficial in removing film 17 after HT when the coated article is still warm therefrom (e.g., when the film 17 is from about 80-200 degrees C., more preferably from about 100-180 degrees C.; although the removal of film 17 may also take place at room temperature in certain example embodiments). After film 17 has been removed, the remaining coated article is shown at the right side of FIGS. 2-4, and includes an outer layer comprising scratch resistant DLC 11. The aforesaid processes are advantageous in that they provide a technique for allowing a coated article including a protective DLC inclusive layer 11 to be heat treated without the DLC layer 11 burning off or significantly oxidizing during such HT. In other words, it becomes possible to provide a protective DLC inclusive layer 11 on a heat treated (e.g., thermally tempered) product in a commercially acceptable manner. According to certain example embodiments of this invention, coated articles herein lose no more than about 15% of their visible transmission due to HT, more preferably no more than about 10%, even more preferably no more than about 2.4% or 2.25%. Moreover, monolithic coated articles herein preferably have a visible transmission after HT of at least about 50%, more preferably of at least about 60 or 75%.

Examples were made and tested as follows:
Reference 1: glass/DLC/$ZnO_x$ (167 nm; N/O [z/x]=0)/AlN (60 nm)
Reference 2: glass/DLC/$ZnO_xN_z$ (166 nm; N/O [z/x]=0.07)/AlN (60 nm)
Reference 3: glass/DLC/$ZnO_xN_z$ (163 nm; N/O [z/x]=0.24)/AlN (60 nm)
Example 1: glass/DLC/$ZnO_xN_z$ (108 nm; N/O [z/x]=0.72)/AlN (60 nm)
Example 2: glass/DLC/$ZnO_xN_z$ (112 nm; N/O [z/x]=0.57)/AlN (60 nm)
Example 3: glass/DLC/$ZnO_xN_z$ (107 nm; N/O [z/x]=0.65)/AlN (60 nm)
Example 4: glass/DLC/$ZnO_xN_z$ (104 nm; N/O [z/x]=0.77)/AlN (60 nm)
Example 5: glass/DLC/$ZnO_xN_z$ (101 nm; N/O [z/x]=0.45)/AlN (60 nm)

The only difference between how the samples above were made is with respect to the release layer 17a. In References 1-2 and Examples 1-5 identified above, the z/x ratio is the nitrogen to oxygen (N/O) gas ratio used during sputtering the zinc oxynitride layer on the substrate over the DLC. The DLC layer 11 was ion beam deposited, whereas the layers 17a and 17b were sputter-deposited at approximately room temperature for all samples. The nitrogen/oxygen contents were adjusted by adjusting nitrogen and oxygen gas flows using during the sputtering, and the sputtering power (P/kW) and time was essentially the same for all samples. Reference 1 is similar to prior art FIG. 1, where the cermet zinc oxide inclusive release layer contained no nitrogen. Meanwhile, References 2-3 contained small amounts of nitrogen in the release layer 17a, whereas Examples 1-5 contained significant amounts of nitrogen in the release layer 17a. It will be appreciated that the stacks in Examples 1-5 are similar to FIG. 2. The prior art Reference 1 sample was problematic for the reasons explained in the background section above. Examples 1-5, with significant amounts of nitrogen added to the release layer 17a, were particularly advantageous in that they provided the stack with improved visible transmission after HT, a higher degree of electrochemical homogeneity, surprisingly smoother layers, and good passivation of the ZnO in the release layer to provide a more chemically stable interface with the AlN barrier layer. Moreover, it was surprisingly found that the nitrogen amounts added to the release layer in Examples 1 and 3-5 (Example 2 was not tested in this respect) eliminated burning during HT at 650 degrees C. for about 10-15 minutes in overlap areas where adjacent protective Novacel TPF 9047 films overlap each other. However, in contrast, References 1-3 experienced significant burning during HT in overlap areas where adjacent protective Novacel TPF 9047 films overlap each other, presumably because the nitrogen amounts in Examples 1 and 3-5 prevents or reduces the layer 17a from acting like a battery during sequences of high and low humidity/temperature and the layer has a reduction in surface energy (compared to References 1-3). It was found that such burning can be significantly reduced and/or eliminated when the nitrogen to oxygen ratio z/x in the $ZnO_xN_z$ layer 17a is from 0.40 to 1.2, more preferably from 0.55 to 1.2, more preferably from about 0.55 to 1.0, even more preferably from about 0.60 to 0.85, and most preferably from about 0.63 to 0.80. However, when the nitrogen to oxygen ratio z/x is less than 0.55 (e.g., see References 2-3), the undesirable burning still occurred. And higher nitrogen to oxygen ratios z/x can be problematic with respect to ease of film removal after HT and/or with respect to reductions in visible transmission. Thus, the above nitrogen to oxygen ratios z/x have been found to be surprisingly advantageous with respect to both prior art FIG. 1 (Reference 1) and with respect to small amounts of nitrogen below these ranges being added to the release layer 17a. Thus, certain embodiments of this invention allow coextruded TPF (e.g., Novacel 9047 TPF) to be used over the film 17 if desired during HT, although the TPF is optional. As explained above, no burned overlap was detected in certain example embodiments of this invention, which indicates improved thermal stability.

Figure 5:
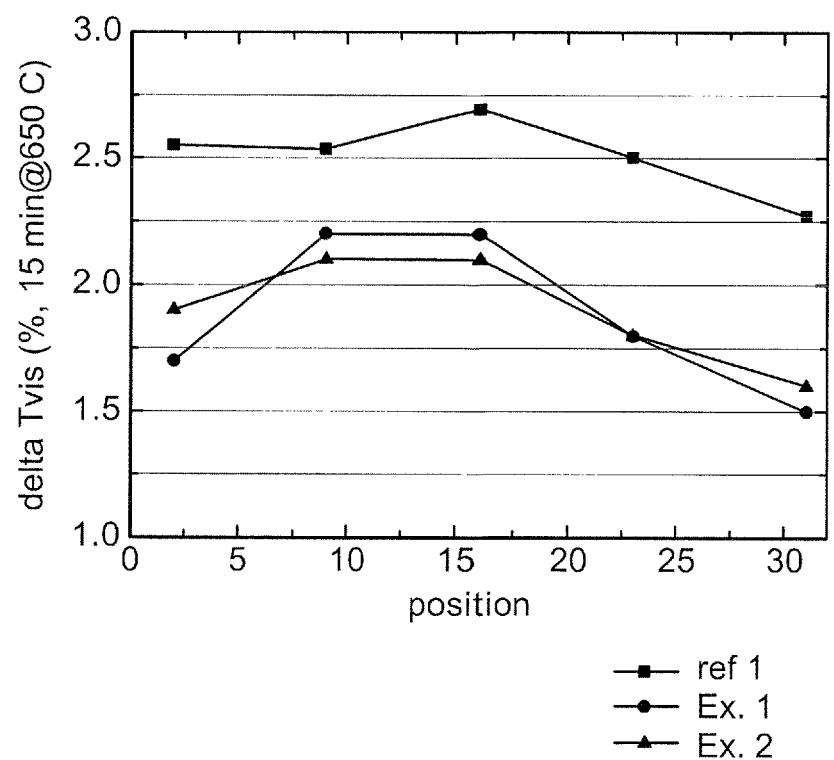
FIG. 5 is a position versus delta Tvis (% change in visible transmission from before to after fifteen minutes of heat treatment at 650 degrees C.), comparing first and second examples of this invention as shown in FIG. 2 to a "reference" shown in FIG. 1.

It was also surprisingly found that introduction of nitrogen into the release layer 17a increases the film side reflectance of the layer 17a. For example, introducing about 120-150 sccm nitrogen at 25.7 kW (within the above preferred z/x ratios) increases visible reflectance of zinc oxynitride layer 17a at least about 25% compared to Reference 1, with similar transmittance, which can be interpreted as a loss of surface roughness of layer 17a (i.e., more smooth) due to the nitrogen. Such nitrogen introduction also caused the thickness of the layer 17a to surprisingly goes down from about 167 nm (Reference 1) to about 110 nm (Examples 1-5) even though essentially the same power and sputtering time were used in all samples, indicating that this nitrogen introduction also reduces the presence of the zinc oxide macroparticles and results in a more smooth layer 17a and thus a more smooth barrier 17b which will result in less pinholes and less oxidizing of the DLC 11 during HT. Thus, ZnON layer 17a reduces the loss of visible transmittance (before vs. after HT) because the smoother layers 17a, 17b with less pinholes will result in less sp3-like carbon (more transmissive) in layer 11 being transformed into sp2-like carbon (less transmissive). FIG. 5 is a position versus delta Tvis (% change in visible transmission from before to after fifteen minutes of HT at 650 degrees C.), comparing Examples 1-2 to Reference 1. It can be seen that the change (loss) in visible transmission of Examples 1-2 was less than that of Reference 1 due to the HT, which indicates that the added nitrogen into layer 17a resulted in better protection of the DLC 11 during HT because less sp3-like carbon (more transmissive) in layer 11 transformed into sp2-like carbon (less transmissive) in Examples 1-2 compared to Reference 1.

There is provided a method of making a heat treated coated article, the method comprising: heat treating a coated glass substrate, the coated glass substrate comprising, prior to the heat treating, a glass substrate, a layer comprising diamond-like carbon (DLC) on the glass substrate, and a protective film on the glass substrate over at least the layer comprising DLC, wherein the protective film includes a release layer and an oxygen barrier layer, the release layer and the oxygen barrier layer being of different material, and wherein the release layer comprises zinc oxynitride $ZnO_xN_z$ where a nitrogen to oxygen ratio z/x in the release layer is at least 0.40; during said heat treating of the coated glass substrate with the layer comprising DLC and the protective film thereon, the protective film prevents significant burnoff of the layer comprising DLC, and wherein the heat treating comprises heating the glass substrate to temperature(s) sufficient for thermal tempering, heat strengthening, and/or heat bending; and exposing the protective film to a release liquid and removing at least part of the protective film during and/or after said heat treating.

In the method of the immediately preceding paragraph, the release layer may consist essentially of zinc oxynitride, optionally doped with aluminum.

In the method of any of the preceding two paragraphs, the nitrogen to oxygen ratio z/x in the release layer may be from 0.40 to 1.2, more preferably from 0.55 to 1.0, still more preferably from 0.60 to 0.85, and most preferably from 0.63 to 0.80.

In the method of any of the preceding three paragraphs, the protective film may further comprise a layer comprising silicon nitride located over at least the oxygen barrier layer.

In the method of any of the preceding four paragraphs, the coated glass substrate may further comprise a layer comprising silicon nitride located between the glass substrate and the layer comprising DLC.

In the method of any of the preceding five paragraphs, the heat treating may comprise heating the glass substrate with the layer comprising DLC and the protective film thereon using at least temperature(s) of at least about 550 degrees C.

In the method of any of the preceding six paragraphs, the oxygen barrier layer may comprise or consist essentially of aluminum nitride.

In the method of any of the preceding seven paragraphs, the release layer may be located between at least the glass substrate and the oxygen barrier layer.

In the method of any of the preceding eight paragraphs, the release layer and the oxygen barrier layer may directly contact each other.

In the method of any of the preceding nine paragraphs, the layer comprising DLC may comprise amorphous DLC and/or may have more $sp^3$ carbon-carbon bonds than $sp^2$ carbon-carbon bonds.

In the method of any of the preceding ten paragraphs, the layer comprising DLC may have an average hardness of at least 20 GPa.

In the method of any of the preceding eleven paragraphs, the layer comprising DLC may be hydrogenated.

In the method of any of the preceding twelve paragraphs, the coated article may be substantially transparent before and/or after the heat treating and removal of the protective film.

In the method of any of the preceding thirteen paragraphs, after said removing step at least part of the layer comprising DLC may be exposed so as to be an outermost layer of the coated article.

In certain embodiments of this invention, there is provided a coated article comprising: a glass substrate supporting a coating, the coating comprising moving away from the glass substrate: a layer comprising diamond-like carbon (DLC); a layer comprising zinc oxynitride $ZnO_xN_z$ where a nitrogen to oxygen ratio z/x is from 0.4 to 1.2; and a layer comprising aluminum nitride on the glass substrate over and directly contacting the layer comprising zinc oxynitride.

The coated article of the immediately preceding paragraph may further comprise a layer comprising silicon nitride located between the glass substrate and the layer comprising DLC.

In the coated article of any of the preceding two paragraphs, the layer comprising zinc oxynitride may directly contact the layer comprising DLC.

In the coated article of any of the preceding three paragraphs, the nitrogen to oxygen ratio z/x may be from 0.40 to 1.2, more preferably from 0.55 to 1.0, still more preferably from 0.60 to 0.85, and most preferably from 0.63 to 0.80.

In certain example embodiments of this invention, there is provided a method of making a heat treated coated article, the method comprising: heat treating a coated glass substrate, the coated glass substrate comprising, prior to the heat treating, a glass substrate, a layer comprising carbon on the glass substrate, and a protective film on the glass substrate over at least the layer comprising carbon, wherein the protective film includes a release layer and an oxygen barrier layer, wherein the release layer comprises zinc oxynitride $ZnO_xN_z$ and where at least one of: (i) a nitrogen to oxygen ratio z/x in the release layer is at least 0.40, and/or (ii) a ratio of nitrogen gas to oxygen gas during sputtering in an atmosphere in which the release layer is sputter-deposited is at least 0.40; during said heat treating of the coated glass substrate with the layer comprising carbon and the protective film thereon, the protective film prevents significant burnoff of the layer comprising carbon, and wherein the heat treating comprises heating the glass substrate to temperature(s) sufficient for thermal tempering, heat strengthening, and/or heat bending; and removing at least part of the protective film during and/or after said heat treating.

In the method of the immediately preceding paragraph, the release layer may consist essentially of zinc oxynitride, optionally doped with aluminum.

In the method of any of the preceding two paragraphs, at least one of the following (i), (ii) may be satisfied: (i) the nitrogen to oxygen ratio z/x in the release layer is from 0.40 to 1.2, more preferably from 0.55 to 1.0, still more preferably from 0.60 to 0.85, and most preferably from 0.63 to 0.80, and/or (ii) a ratio of nitrogen gas to oxygen gas during sputtering in an atmosphere in which the release layer is sputter-deposited is from 0.40 to 1.2, more preferably from 0.55 to 1.0, still more preferably from 0.60 to 0.85, and most preferably from 0.63 to 0.80.

In the method of any of the preceding three paragraphs, the heat treating may comprise heating the glass substrate with the layer comprising carbon and the protective film thereon using at least temperature(s) of at least 550 degrees C., more preferably at least about 580 degrees C. or 600 degrees C.

In the method of any of the preceding four paragraphs, the oxygen barrier layer may comprise or consist essentially of aluminum nitride.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a heat treated coated article, the method comprising:

heat treating a coated glass substrate, the coated glass substrate comprising, prior to the heat treating, a glass substrate, a layer comprising diamond-like carbon (DLC) on the glass substrate, and a protective film on the glass substrate over at least the layer comprising DLC, wherein the protective film includes a release layer and an oxygen barrier layer, the release layer and the oxygen barrier layer being of different material, and wherein the release layer comprises zinc oxynitride $ZnO_xN_z$ where a nitrogen to oxygen ratio z/x in the release layer is from 0.77 to 1.0;

during said heat treating of the coated glass substrate with the layer comprising DLC and the protective film thereon, the protective film prevents significant burnoff of the layer comprising DLC, and wherein the heat treating comprises heating the glass substrate to temperature(s) sufficient for thermal tempering, heat strengthening, and/or heat bending; and exposing the protective film to a release liquid and removing at least part of the protective film during and/or after said heat treating.

2. The method of claim 1, wherein the release layer consists essentially of zinc oxynitride doped with aluminum.

3. The method of claim 1, wherein the protective film further comprises a layer comprising silicon nitride located over at least the oxygen barrier layer.

4. The method of claim 1, wherein the coated glass substrate further comprises a layer comprising silicon nitride located between the glass substrate and the layer comprising DLC.

5. The method of claim 1, wherein the oxygen barrier layer comprises aluminum nitride.

6. The method of claim 1, wherein the release layer and the oxygen barrier layer directly contact each other.

7. The method of claim 1, wherein the layer comprising DLC comprises amorphous DLC and has more $sp^3$ carbon-carbon bonds than $sp^2$ carbon-carbon bonds.

8. The method of claim 1, wherein the layer comprising DLC has an average hardness of at least 20 GPa.

9. The method of claim 1, wherein the layer comprising DLC is hydrogenated.

10. The method of claim 1, wherein the coated article is substantially transparent at least following heat treating and removal of the protective film.

11. A method of making a heat treated coated article, the method comprising:

heat treating a coated glass substrate, the coated glass substrate comprising, prior to the heat treating, a glass substrate, a layer comprising diamond-like carbon (DLC) on the glass substrate, and a protective film on the glass substrate over at least the layer comprising DLC, wherein the protective film includes a release layer and an oxygen barrier layer, the release layer and the oxygen barrier layer being of different material, and wherein the release layer comprises zinc oxynitride $ZnO_xN_z$ where a nitrogen to oxygen ratio z/x in the release layer is from 0.77 to 1.0;

during said heat treating of the coated glass substrate with the layer comprising DLC and the protective film thereon, the protective film prevents significant burnoff of the layer comprising DLC;

wherein the heat treating comprises using temperature(s) of at least 580 degrees C.; and removing at least part of the protective film during and/or after said heat treating.

12. The method of claim 11, wherein the release layer consists essentially of zinc oxynitride doped with aluminum.

13. The method of claim 11, wherein the protective film further comprises a layer comprising silicon nitride located over at least the oxygen barrier layer.

14. The method of claim 11, wherein the coated glass substrate further comprises a layer comprising silicon nitride located between the glass substrate and the layer comprising DLC.

15. The method of claim 11, wherein the oxygen barrier layer comprises aluminum nitride.

16. The method of claim 11, wherein the release layer and the oxygen barrier layer directly contact each other.

17. The method of claim 11, wherein the coated article is substantially transparent at least following heat treating and removal of the protective film.

\* \* \* \* \*